US007255096B2

(12) United States Patent
Craig et al.

(10) Patent No.: US 7,255,096 B2
(45) Date of Patent: Aug. 14, 2007

(54) GAS HEAT EXCHANGER

(75) Inventors: Ian Anthony Craig, Blackwood (GB); Raymond William Challis, Cardiff (GB); Charles James Penny, Whitchurch (GB); Paul Downs, Oakdale (GB); Mark Robert Hacker, Caerphilly (GB)

(73) Assignee: Senior Investments AG, Schaffhausen (CH)

(*) Notice: Subject to any disclaimer, the term of this patent is extended or adjusted under 35 U.S.C. 154(b) by 0 days.

(21) Appl. No.: 11/199,454

(22) Filed: Aug. 8, 2005

(65) Prior Publication Data

US 2006/0032612 A1 Feb. 16, 2006

(30) Foreign Application Priority Data

Aug. 12, 2004 (GB) ................................ 0417920.6

(51) Int. Cl.
*F02M 25/07* (2006.01)
*F02B 47/08* (2006.01)
*F28F 27/02* (2006.01)
*G05D 23/00* (2006.01)

(52) U.S. Cl. ................ 123/568.12; 165/103; 165/157; 165/297

(58) Field of Classification Search ........... 123/568.11, 123/568.12; 60/605.2, 320; 165/103, 172, 165/157, 158, 297
See application file for complete search history.

(56) References Cited

U.S. PATENT DOCUMENTS

| | | | | |
|---|---|---|---|---|
| 4,993,367 | A | 2/1991 | Kehrer | |
| 5,732,688 | A * | 3/1998 | Charlton et al. | 123/568.12 |
| 6,718,956 | B2 * | 4/2004 | Klipfel et al. | 123/568.12 |
| 6,807,955 | B2 * | 10/2004 | Leedham et al. | 123/568.12 |
| 6,976,480 | B2 * | 12/2005 | Miyoshi et al. | 123/568.12 |
| 6,976,530 | B2 * | 12/2005 | Hayashi et al. | 123/568.12 |
| 7,032,577 | B2 * | 4/2006 | Rosin et al. | 123/568.12 |
| 7,036,565 | B2 * | 5/2006 | Brost et al. | 165/103 |
| 2005/0199381 | A1 * | 9/2005 | Mercz et al. | 123/568.12 |

FOREIGN PATENT DOCUMENTS

| | | |
|---|---|---|
| JP | 11303689 | 11/1999 |
| JP | 2000130964 | 5/2000 |
| JP | 2004218489 | 8/2004 |

* cited by examiner

*Primary Examiner*—Willis R. Wolfe, Jr.
(74) *Attorney, Agent, or Firm*—Greenberg Traurig, LLP

(57) ABSTRACT

There is provided a gas heat exchanger 101 comprising a coolant conduit 102 having a coolant inlet 103 and a coolant outlet 104, a gas cooling conduit 201, and a gas bypass conduit 203. At least a portion of the gas cooling conduit 201 is disposed between at least a portion of the coolant conduit 102 and a portion of the bypass conduit 203. During a first mode of operation, the gas cooling conduit 201 is configured to carry gas. During a second mode of operation, the bypass conduit 203 is configured to carry gas and the gas cooling conduit 201 is configured to reduce a heat exchange between the coolant conduit 102 and the bypass conduit 203.

25 Claims, 9 Drawing Sheets

A

B

GAS HEAT EXCHANGER

BACKGROUND OF THE INVENTION

1. The Technical Field

The present invention relates to gas heat exchangers.

2. The Prior Art

There are many applications in which it is desirable to use gas heat exchangers. These include applications where it is desired to cool down a gas, for example in exhaust gas recirculation (EGR) coolers, and applications in which the heat extracted from the gas can be recovered, for example to warm the cabin of a vehicle.

Under some circumstances, heat exchange may be required, but under other circumstances it may be undesirable. For example, at the beginning of operation of a vehicle, heat may be extracted from exhaust gas to assist in warming up the cabin of a vehicle. In this case, heat extraction is required. However, once the cabin reaches the required temperature, further warming could be undesirable. Therefore under these circumstances, heat extraction is not required.

Another example is exhaust gas recirculation. Exhaust gas recirculation is a method of reducing noxious emissions from internal combustion engines. In particular, the presence of exhaust gas in the combustion mixture reduces the tendency to form $NO_x$ compounds.

In general it is advantageous to cool the re-circulated exhaust gas. Its reduced temperature helps to lower the combustion temperature within the cylinder of the engine. EGR gas is also more dense when cooled, and therefore for a given mass of gas, a lower volume of air is displaced from the combustion chamber. Cooling the EGR gas is not desirable under all conditions however. When engine temperature is low and under low engine loads it is often preferable to recirculate EGR gas without cooling.

Many applications requiring heat exchange, including EGR systems, therefore require a bypass, to control whether the gas is cooled or not. When it is required for heat losses from the gas to be reduced, the gas is diverted through the bypass channel. When it is required for heat losses from the gas to be increased, that is to say, when the gas is being cooled, the efficiency of the cooler should be high, and the gas is not passed through a bypass channel.

An exhaust gas recirculation cooler typically comprises at least one gas cooling conduit configured to carry gas, at least one conduit configured to carry a coolant fluid, and a bypass conduit. The coolant conduit and the gas cooling conduit are in close proximity, such that gas that is transported through the gas cooling conduit is in proximity to coolant fluid and therefore is cooled down. When gas cooling is required, then the gas is diverted to be carried by the gas cooling conduit. Under circumstances where gas cooling is not required, then the gas is diverted through the bypass conduit. A bypass valve controls whether the gas is carried in the gas cooling conduit or the bypass conduit. For EGR applications, the bypass valve is separate from an EGR valve, which controls whether EGR gas is flowing at all.

When gas is being transported through the bypass conduit, it is undesirable for the gas to be cooled. To achieve this, there should be little or no contact between the bypass conduit and the coolant conduit, as coolant fluid in the coolant conduit would cool gas that is transported through the bypass conduit under bypass conditions. Prior art solutions to minimise contact between the bypass conduit and the coolant conduit are already known.

It is known to use an external bypass channel, for example US2003150434, and WO03085252. The external bypass channel takes up additional space, which is a disadvantage for applications where packaging in the engine space is restricted. However, this solution is used because the bypass conduit is external to the exhaust gas cooling conduit and the coolant conduit and therefore the bypass conduit is not cooled by the coolant conduit.

A solution to this has been provided in U.S. Pat. No. 6,718,956 in which the bypass conduit is disposed within the main housing. The housing comprises a coolant conduit, in which a series of gas cooling conduits are disposed and also in which a bypass conduit is disposed. The bypass conduit is therefore in contact with the coolant in this type of cooler, which is undesirable. Complicated modifications are required to minimise the degree of cooling between the coolant fluid and the bypass conduit when the exhaust gas is flowing through the bypass conduit. These include having a double-walled bypass conduit with a vacuum between the two walls to reduce a heat exchange between the coolant fluid contained in the coolant conduit and the exhaust gas carried by the bypass conduit.

Another disadvantage of a bypass conduit is that the material in the bypass conduit acts as a heat sink when hot EGR gas is diverted through it. A transient period occurs during which some heat is extracted from the gas by contact with the conduit wall.

An alternative to having a bypass conduit is to have a valve that controls whether the coolant fluid flows through the coolant conduit or not. In this instance, a bypass conduit for the gas is not required. If cooling of the exhaust gas is required, then coolant flows through the coolant conduit and the exhaust gas is cooled. If cooling of the exhaust gas is not required then coolant does not flow through the coolant conduit and therefore the exhaust gas is not cooled. However, there are problems with this type of system. For example, when cooling is not required, residual coolant can be left in the coolant conduit. Coolant fluid typically contains volatile additives, which may be given off when the conduit is heated. The formation of steam and volatile substances is not desirable.

SUMMARY OF THE INVENTION

It is an object of the present invention to provide an improved exhaust gas recirculation cooler that does not require an external bypass channel, or does not necessarily require a coolant valve for selecting whether or not coolant fluid flows through the coolant channel. The inventors have realised the problems associated with prior art gas heat exchanges with bypass conduits, and have devised a gas heat exchanger in which the gas cooling conduit is disposed between the bypass conduit and the coolant conduit, thereby reducing a contact between the bypass conduit and the coolant conduit. This reduces any undesirable heat exchange between the bypass conduit and the coolant conduit, as the gas cooling conduit acts as a thermal barrier between the coolant conduit and the bypass conduit.

According to a first aspect there is provided a gas heat exchanger comprising:

a coolant conduit;

a gas cooling conduit;

a gas by-pass conduit;

wherein at least a portion of the gas cooling conduit is disposed between at least a portion of the coolant conduit and at least a portion of the gas by-pass conduit, wherein the gas cooling conduit is configured to provide a thermal barrier between the coolant conduit and the gas by-pass conduit.

Preferably, during a first mode of operation the gas cooling conduit is configured to carry a gas; and during a second mode of operation the gas cooling conduit is configured to reduce a heat exchange between the coolant conduit and the bypass conduit, and the bypass conduit is configured to carry a gas.

Preferably, the gas cooling conduit is disposed substantially along a length of the gas heat exchanger between the coolant conduit and the bypass conduit.

Preferably, at least a portion of a wall of the gas cooling conduit defines an interface between the gas cooling conduit and the coolant conduit; and at least a portion of a wall of said gas by-pass conduit defines an interface between said gas by-pass conduit and said gas cooling conduit.

Preferably, the gas cooling conduit is disposed substantially within the coolant conduit; and the gas by-pass conduit is disposed substantially within the gas cooling conduit.

Preferably, the coolant conduit is corrugated along at least a portion of its length.

Preferably, the gas cooling conduit is corrugated along at least a portion of its length.

Preferably, the gas by-pass conduit is corrugated along at least a portion of its length.

Preferably, the gas by-pass conduit is formed of strip-wound hose.

Preferably, the gas heat exchanger comprises at least one bend along its length.

Preferably, the gas heat exchanger comprises a valve, the valve configured to switch a gas flow through the gas cooling conduit during a first mode of operation, and through the gas by-pass conduit during a second mode of operation.

Preferably, the coolant conduit comprises an outer tube; and the gas cooling conduit comprises a first inner tube, the first inner tube being disposed substantially within the outer tube; and the gas by-pass conduit comprises a second inner tube, the second inner tube being substantially disposed within the first inner tube.

Preferably, an insert is disposed between the outer tube and the first inner tube, and an insert is disposed between the first inner tube and the second inner tube, the inserts being configured to maintain the tubes in a substantially concentric position;

the inserts being selected from any of the following: clip; ring; bracket; form of compressed wire mesh.

Alternatively, the outer tube comprises at least one indent configured to separate the first inner tube from the outer tube; and the first inner tube comprises at least one indent configured to separate the first inner tube from the second inner tube;

wherein the indents are configured to maintain the tubes in a substantially concentric position.

Alternatively, the first inner tube comprises at least one protrusion configured to separate the first inner tube from the outer tube; and the second inner tube comprises at least one protrusion configured to separate the second inner tube from the first inner tube;

wherein the protrusions are configured to maintain the tubes in a substantially concentric position.

Preferably, each tube has a wall thickness of between 0.2 and 1.5 mm.

Preferably, each tube is fabricated from a material consisting of at least one of the following materials: austenitic stainless steel; ferritic stainless steel; copper; copper alloy; nickel; nickel alloy; carbon fibre braid.

Preferably, the gas heat exchanger comprises means to connect the gas heat exchanger at at least one end with an exhaust gas system of an internal combustion engine.

Preferably, during a third mode of operation the gas cooling conduit and the bypass conduit are both configured to carry gas.

Preferably, the gas heat exchanger comprises a throttle valve, the throttle valve being configured to control a degree of gas flow through the gas cooling conduit and to control a degree of gas flow through the bypass conduit.

According to a second aspect there is provided an internal combustion engine comprising the gas heat exchanger.

According to third aspect there is provided a method of manufacturing a gas heat exchanger comprising:

providing a coolant conduit;

providing a gas cooling conduit;

providing a gas by-pass conduit;

disposing at least a portion of the gas cooling conduit between at least a portion of the coolant conduit and at least a portion of the gas bypass conduit such that the gas cooling conduit is configured to provide a thermal barrier between the coolant conduit and the gas by-pass conduit.

Preferably, the method comprises:

disposing the gas by-pass conduit substantially within the gas cooling conduit, such that the gas by-pass conduit and the gas cooling conduit are substantially concentric; and disposing at least one first spacer between the gas by-pass conduit and the gas cooling conduit such that the first spacer maintains the gas by-pass conduit and the gas cooling conduit in a substantially concentric position; and disposing the gas cooling conduit substantially within the coolant conduit, such that the gas cooling conduit and the coolant conduit are substantially concentric; and disposing at least one second spacer between the gas cooling conduit and the coolant conduit such that the second spacer maintains the gas cooling conduit and the coolant conduit in a substantially concentric position; and affixing the coolant conduit, the gas cooling conduit and the gas bypass conduit together at at least one end;

forming a first spacer between the gas by-pass conduit and the gas cooling conduit by pressing a depression in a surface of the gas cooling conduit; and forming a second spacer between the gas cooling conduit and the coolant conduit by pressing a depression in a surface of the coolant conduit.

Preferably, the method comprises bending said gas heat exchanger into a required configuration.

BRIEF DESCRIPTION OF THE DRAWINGS

For a better understanding and to show how the same may be carried into effect, there will now be described by way of example only, specific embodiments, methods and processes with reference to the accompanying drawings in which.

DETAILED DESCRIPTION OF THE INVENTION

There will now be described by way of examples several specific embodiments contemplated by the inventors. In the following description numerous specific details are set forth in order to provide a thorough understanding. It will be apparent however, to one skilled in the art, that the present invention may be practiced without limitation to these specific details.

Throughout the description, the following terms are used:

'Gas cooling conduit' refers to a conduit through which gas is configured to pass when heat extraction from the gas is required.

'Coolant conduit' refers to a conduit through which coolant medium such as coolant fluid is configured to pass. A coolant medium may be used to reduce the temperature of the gas in the gas cooling conduit, or may be used to extract heat from the gas in the gas cooling conduit to be used elsewhere.

'Bypass conduit' refers to a conduit through which gas is configured to pass when heat extraction from the gas is not required.

Figure 1:
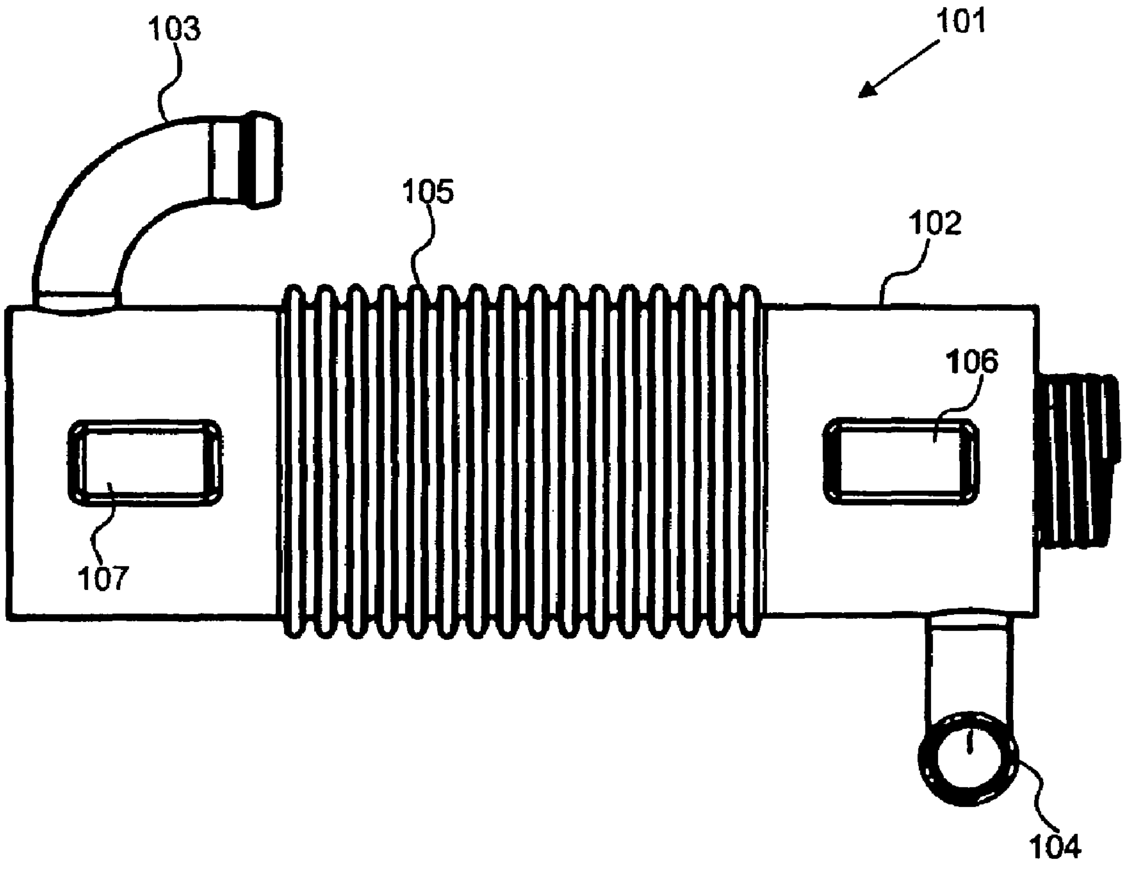
FIG. 1 illustrates schematically a side elevation view of a gas heat exchanger.

Referring to FIG. 1 herein, there is illustrated schematically a side elevation view of a gas heat exchanger 101. The gas heat exchanger 101 comprises a coolant conduit 102, a coolant inlet 103 and a coolant outlet 104. In this embodiment the coolant conduit 102 comprises corrugations 105 along a portion of its length, although corrugations are not necessary. The coolant conduit also comprises indentations 106, 107.

The coolant conduit 102 is substantially tubular, and the coolant inlet 103 and coolant outlet 104 are configured to allow a coolant medium such as a coolant fluid to flow through the tubular coolant conduit 102. In use, a constant flow of coolant is passed between the inlet 103 and the outlet 104 to increase the efficiency of cooling.

The corrugations 105 have several advantages. If the gas heat exchanger 101 is to be fitted into the exhaust gas recirculation system of a vehicle, then the corrugations allow some degree of flexibility to allow the parts to be fitted in an exhaust gas re-circulation system accommodating positional tolerances of mating parts, that is to say attachment points at either end of the gas heat exchanger. Furthermore, the corrugations give the coolant conduit some degree of flexibility to allow for thermal expansion as the coolant conduit warms up and cools down. The corrugations also allow the coolant conduit to be bent. That is it say, the coolant conduit need not follow a linear path but can comprise one or more bend portions. In addition, the corrugations introduce turbulence into the coolant medium that is flowing through the coolant conduit 102, which increases the efficiency of heat exchange between the coolant medium and the gas.

Figure 2:
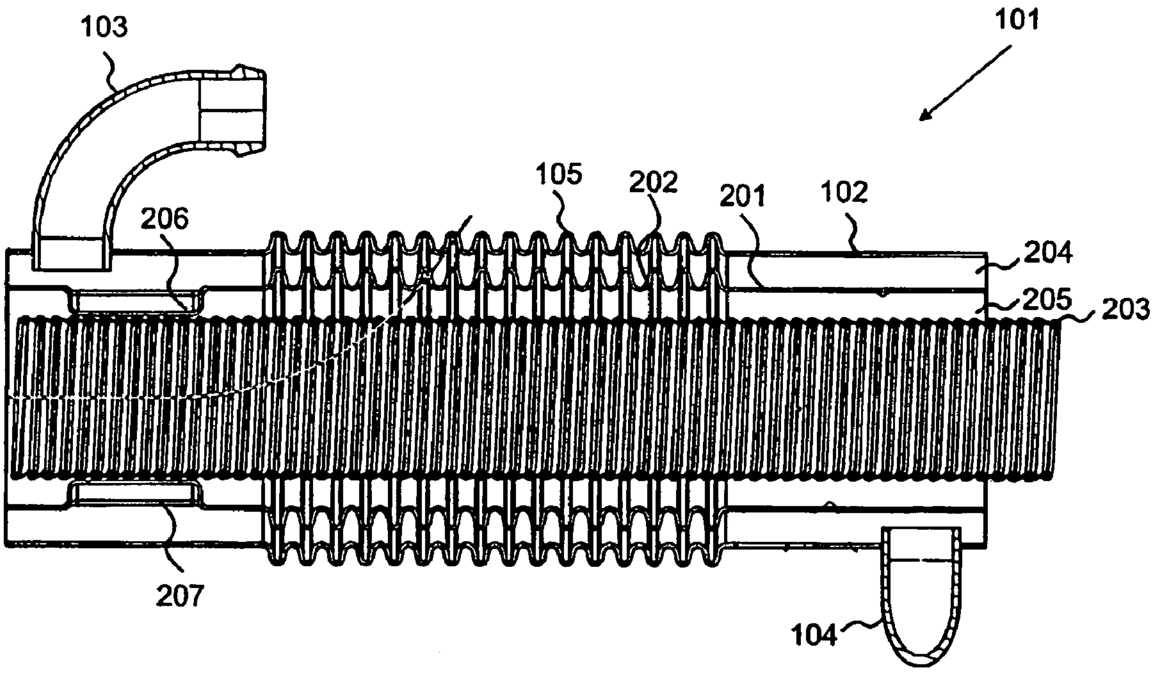
FIG. 2 illustrates schematically a cut-away side elevation view of a gas heat exchanger.

Referring to FIG. 2 herein, there is illustrated schematically a cut-away side elevation view of the gas heat exchanger. In addition to the features shown in FIG. 1, there is shown a gas cooling conduit 201, the gas cooling conduit 201 having corrugations 202 along a portion of its length. There is also shown a bypass conduit 203.

The gas cooling conduit 201 is substantially tubular, and disposed within the tubular coolant conduit 102 such that it is substantially concentric with the coolant conduit 102. The coolant conduit 102 and the gas cooling conduit 201 are substantially concentric. An annular space 204 is defined by the inner wall of the coolant conduit 102 and the outer wall of the gas cooling conduit 201. In use, the coolant fluid flows through this annular space 204.

The corrugations 202 in the gas cooling conduit 201 serve the same function as the corrugations 105 along a portion of the length of the coolant conduit 102. That is to say, they can allow for bend portions in the gas heat exchanger, they increase the turbulence of the coolant fluid thereby increasing the efficiency of heat exchange, they allow for thermal expansion as the gas cooling conduit changes temperature, and they allow for flexibility of the gas heat exchanger to allow it to be fitted into the exhaust system of vehicle with a wide range of tolerances. Furthermore, the corrugations 202 of the gas cooling conduit 201 introduce turbulence into gas that flows through the gas cooling conduit 201. Again, this has the effect of increasing the efficiency of heat exchange between gas flowing through the gas cooling conduit 201 and the coolant medium flowing through the annular space 204 defined by the coolant conduit 102 and the gas cooling conduit 201.

The bypass conduit 203 is substantially tubular, and is disposed such that it is substantially concentric with the gas cooling conduit 201 and the coolant conduit 102.

The outer wall of the bypass conduit 203 and the inner wall of the gas cooling conduit 201 define an annular space 205 through which gas flows when gas is diverted through the gas cooling conduit 201. Alternatively, when exhaust gas is flowing through the bypass conduit 203 it flows through the space defined by the inner walls of the bypass conduit 203.

It is possible to form the gas bypass conduit 203 with corrugations, as with the gas cooling conduit 201 and the coolant conduit 102. The corrugations would have all the same advantages as described above. However, an alternative is to use strip-wound hose, as shown in FIG. 2. Strip-wound hose comprises helically winding strip material into a shape such that the windings interlock along the helical axis. The hose is preferably manufactured from thin gauge austenitic stainless steel strip. The strip wound hose gives the bypass conduit 203 flexibility to allow for thermal expansion relative to the other components of the gas heat exchanger. Furthermore, strip wound hose can be bent therefore allowing the gas heat exchanger to have one or more bend portions. Strip wound hose is not completely air-tight, but it may still be used for the bypass conduit 203 as an air-tight seal between the bypass conduit 203 and the gas cooling conduit 201 is not required. A certain amount of bleeding of gas between the bypass conduit 203 and the gas cooling conduit 201 can be tolerated, as both conduits 203, 201 are configured to carry the same type of gas, and the amount of bleeding through strip wound hose would have a negligible effect on the required heat exchange.

The three conduits 102, 201, 203 can be made from any suitable material, including austenitic steel or ferritic steel. Preferably, the conduits are made of thin gauge material in a range of 0.2 mm to 1.5 mm. The advantage of thin wall material for the gas cooling conduit 201 is that thin steel is a very good conductor of heat and has a low thermal inertia thereby increasing the efficiency of heat transfer between the coolant in the coolant conduit 102 and the gas in the gas cooling conduit 201.

Other materials that can be used for the conduits 102, 201, 203 include, but are not limited to, copper, nickel, alloys of copper or nickel, and carbon fibre braid When heat exchange is required, a coolant flows through an annular space 204 and the gas to be cooled flows through an annular space 205. Annular flow gives better heat transfer characteristics at the wall of the gas cooling conduit 201 between the gas and the coolant fluid than would be the case if the gas flowed through a cylindrical space. This is because the surface area to volume ratio of gas flowing through an annular space is higher than the surface area to volume ratio of gas flowing through a cylindrical space, and because turbulence is introduced at walls which increases the rate of heat transfer.

If cooling of the gas is not required, then the gas is diverted to flow through the bypass conduit 203. As the bypass conduit 203 is disposed substantially within the gas cooling conduit 201, and no gas is flowing through the annular space 205 within the gas cooling conduit 201, then the stagnant gas contained in the gas cooling conduit 201 surrounds the bypass conduit 203 and acts as thermal insulation. This reduces the rate of heat transfer between gas in the bypass conduit 203 and the coolant fluid in the coolant conduit 102.

The annular space 205 between the outer wall of the bypass conduit 203 and the inner wall of the gas cooling conduit 201 therefore serves two purposes. The first is to allow a flow of gas through the cooling conduit 201 when gas cooling is required. The second is to provide a thermal barrier between coolant flowing in the coolant conduit 102 and gas flowing through the bypass conduit 203.

In order to keep the coolant conduit 102, the gas cooling conduit 201 and the bypass conduit 203 substantially concentric, spacers are provided in the annular spaces 204, 205 between the conduits 102, 201, 203. The first spacer 206, 207, in the form of an indentation, is disposed between the gas by-pass conduit 203 and the gas cooling conduit 201. The second spacer 106, 107, in the form of an indentation, is disposed between the gas cooling conduit 201 and the coolant conduit 102. These spacers are not disposed so as to be completely circumferential around the conduits, as this would impede the flow of either the gas in the gas cooling conduit 201 or the coolant in the coolant conduit 102. However, the spacers can be shaped to introduce further turbulence if required, or to reduce turbulent flow.

The spacers illustrated are in the form of indentations in the conduits. However, they can be of any suitable form including inserts such as clips, rings or brackets or a form of compressed wire mesh disposed between two conduits. Alternatively, the spacers can be provided by forming indentations or protrusions in the walls of the conduits. Indentations 106, 107 are shown in the wall of the coolant conduit 102. These indentations, 106 and 107 ensure that the coolant conduit 102 remains substantially concentric with the gas cooling conduit 201, as they contact the outer wall of the gas cooling conduit 201. The same effect could be achieved by having protrusions in the wall of the gas cooling conduit 201 that contact the inner wall of the coolant conduit 102.

Further indentations 206, 207 are shown in the gas cooling conduit 201. These indentations 206, 207 contact the outer wall of the bypass conduit 203 to maintain the bypass conduit 203 in a substantially concentric position relative to the gas cooling conduit 201. Again, the same effect could be achieved by having protrusions in the wall of the bypass conduit 203 that contact the inner wall of the gas cooling conduit 201. The indentations allow for some sliding between the conduits, thereby accommodating slight changes in length of the three conduits 102, 201, 203 during bending or during thermal expansion or contraction of the conduits.

It is also possible that corrugations 105, 202 in the walls of the conduits 102, 201, 203 can act as spacers between adjacent walls. This requires the corrugations to be helical to allow flow of gas through the gas cooling conduit 201 or coolant conduit 102. This is not preferred, as forcing fluids to flow through a helical path would lead to a pressure drop.

A further advantage of the gas heat exchanger arrangement is that when gas is being cooled and therefore flowing through the gas cooling conduit 201, the wall of the bypass conduit 203 is heated by contact with the gas. When cooling is no longer required, then the gas is diverted to flow through the bypass conduit 203, which has been pre-heated by contact with the gas in the gas cooling conduit 201. The heat losses from the gas flowing through the bypass conduit 203 are therefore reduced as a result of contacting the pre-heated wall of the bypass conduit 203.

Whilst the advantages of providing corrugations in the conduits 102, 201, 203 are described above, corrugations are not an essential feature.

Figure 3:
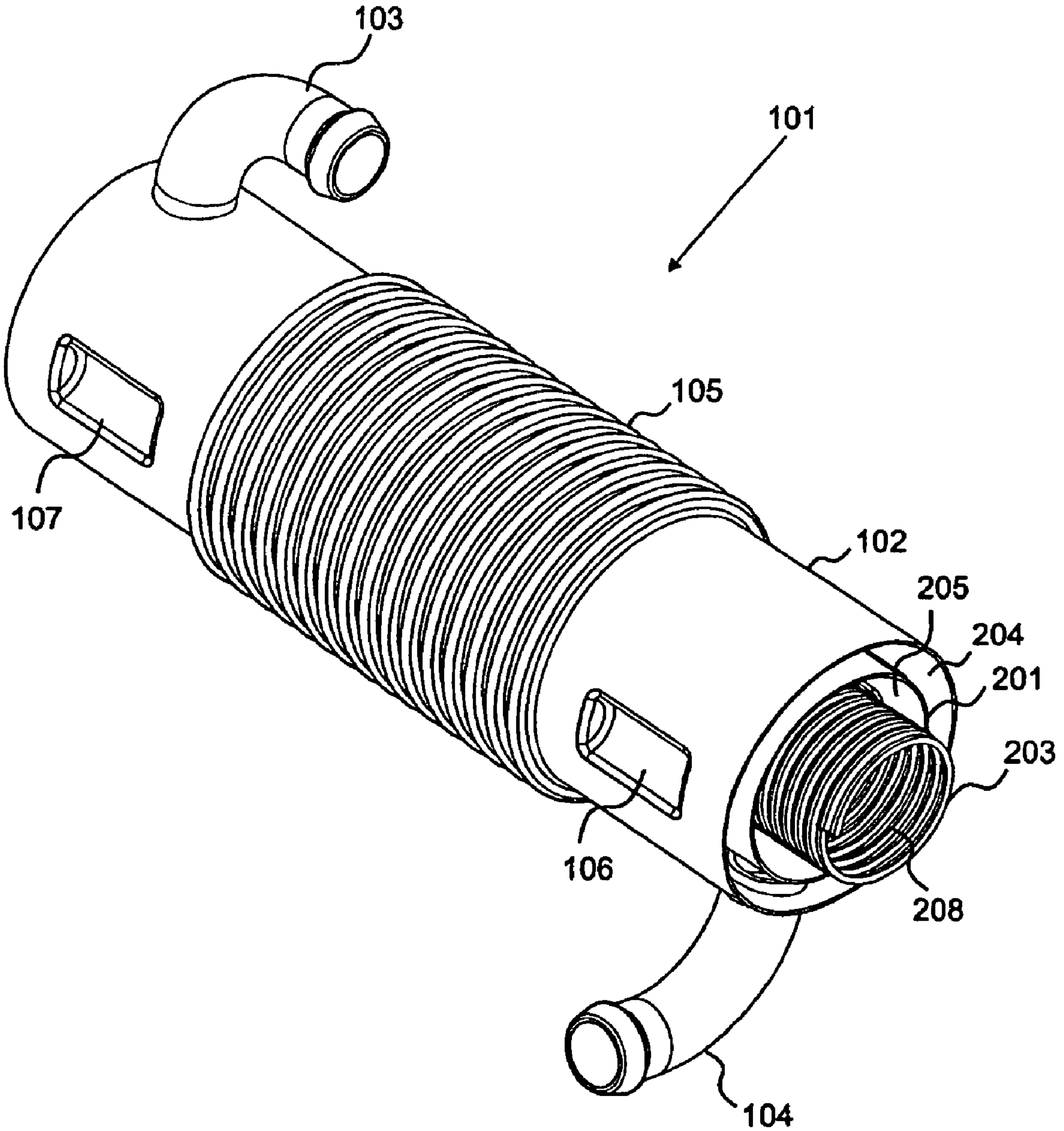
FIG. 3 illustrates schematically a perspective view of a gas heat exchanger.

Referring to FIG. 3 herein, there is illustrated schematically a perspective view of the gas heat exchanger 101. This view illustrates more clearly the annular space 204 defined by the inner wall of the coolant conduit 102 and the outer wall of the gas cooling conduit 201. Coolant fluid flows through this annular space 204 when the gas heat exchanger 101 is in use. The coolant fluid is introduced into the coolant conduits 102 via the coolant inlet 103, and removed from the coolant conduit 102 by the coolant outlet 104.

FIG. 3 also shows more clearly the annular space 205 defined by the inner wall of the gas cooling conduit 201 and the outer wall of the bypass conduit 203. When the gas heat exchanger is operating in such a manner as to cool the gas, gas flows through this annular space 205. There is therefore contact between coolant fluid in the coolant annular space 204 and gas in the gas annular space 205 via the interface of the wall of the gas cooling conduit 201. This wall should be substantially gas tight, as it is undesirable for the coolant fluid to mix with the gas.

FIG. 3 also shows more clearly the space 208 defined by the inner wall of the bypass conduit 203 through which gas flows when no cooling of the gas is required.

Figure 4:
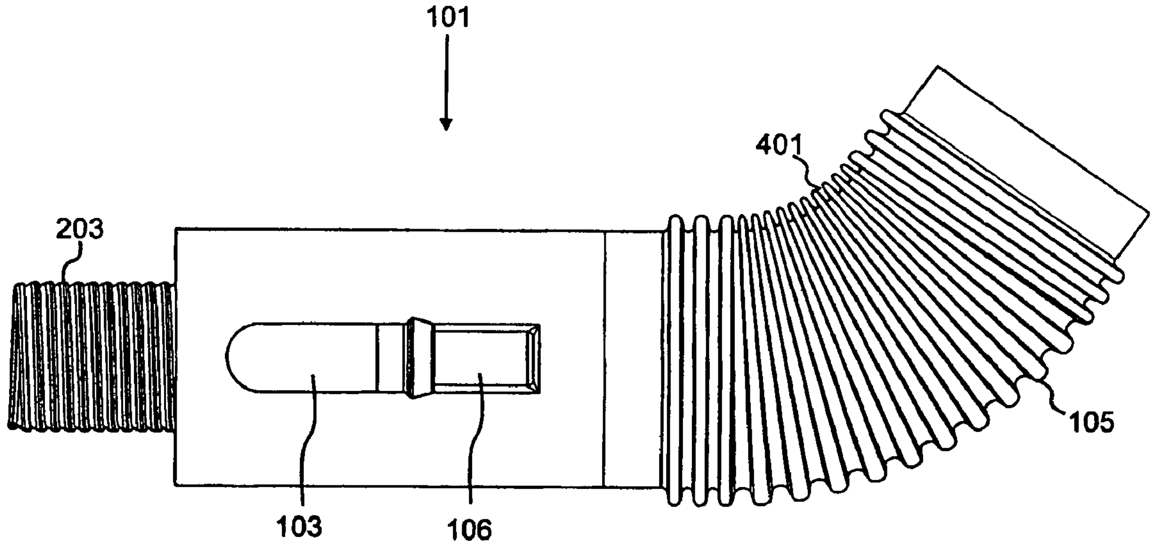
FIG. 4 illustrates schematically a side elevation view of a portion of a gas heat exchanger comprising a bend portion.

Referring to FIG. 4 herein, there is illustrated a side elevation view of a portion of the gas heat exchanger comprising a bend. This allows the gas heat exchanger to be used to connect non co-linear portions of, for example, an exhaust system in a vehicle, or to follow a complicated path from an exhaust manifold to an intake manifold in an exhaust gas recirculation system. The bend 401 is accommodated by the corrugations in the conduits (corrugations 105 are shown for the coolant conduit 102).

Where all three conduits 102, 201, 203 are flexible, either by having corrugations 105, 202 or by being formed of strip wound hose, and spacers are provided between the conduits, a bend can be formed by first assembling the component with the three conduits disposed coaxially. The bypass conduit 203 is disposed within the gas cooling conduit 201, and the gas cooling conduit 201 is disposed within the coolant conduit 102. Once the component has been assembled, the components can then be bent into shape. The use of spacers maintains the substantially coaxial position of the conduits when the gas heat exchanger is bent into the required shape. It is important that the spacers between the conduits are not fixed to both conduits, as some sliding movement should be accommodated during the bending process or during thermal expansion and contraction of the conduits during use.

Figure 5:
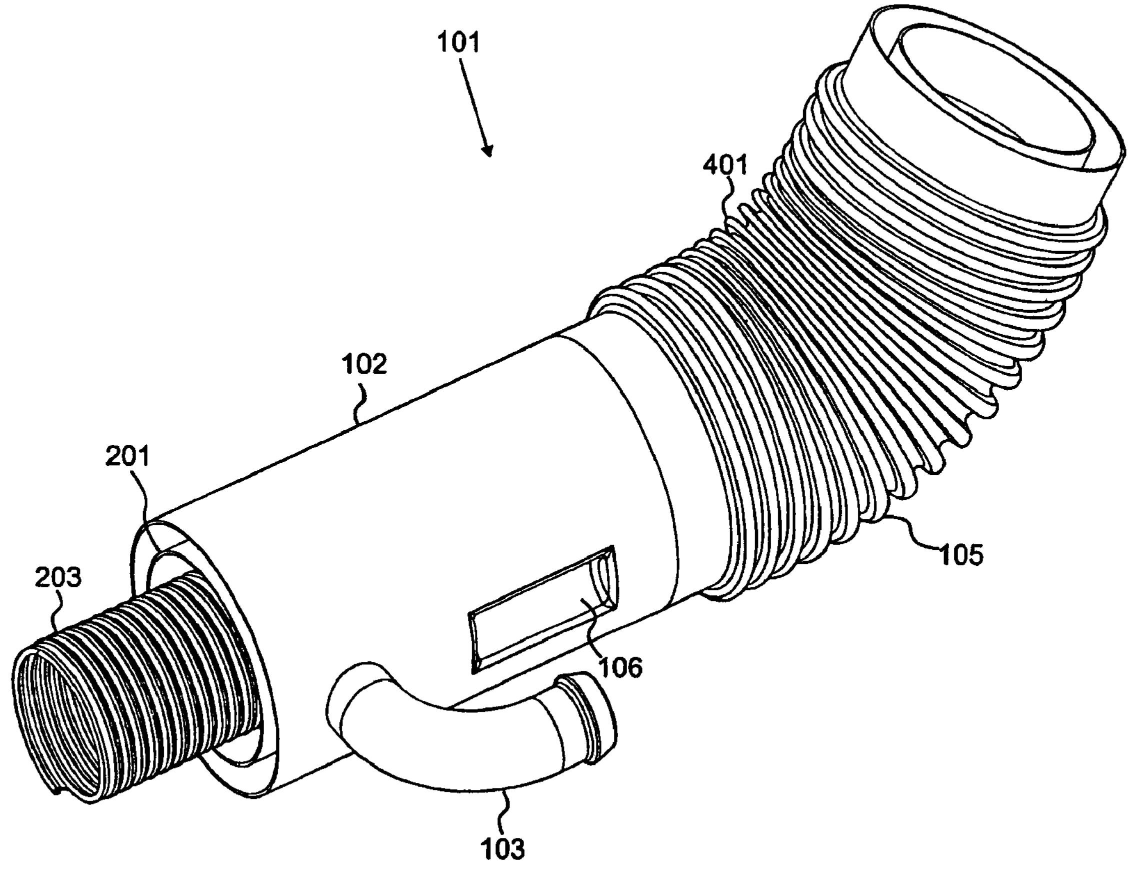
FIG. 5 illustrates schematically a perspective view of a portion of a gas heat exchanger comprising a bend portion.

Referring to FIG. 5 herein, there is illustrated schematically a perspective view of a portion of a gas heat exchanger comprising a bend. It can be seen that the coolant bypass 203 extends beyond the length of the coolant conduit 102 and the gas cooling conduit 201. This can be accommodated at the outlet of the gas heat exchanger, as the outlet of the gas cooling conduit 201 and the outlet of the bypass conduit 203 typically connect to a single outlet conduct. The outlet of the bypass conduit 203 does not need to be fixed in position, and is maintained in a substantially concentric position with the gas cooling conduit 201 owing to the spacers 206, 207 between the gas cooling conduit 201 and the bypass conduit 203.

The gas heat exchanger should be connected at both ends to the system through which gas is flowing. In the example of an exhaust gas recirculation cooler, the gas heat exchanger should be connected in the exhaust gas recirculation system of a vehicle. Furthermore, a valve is required to switch the gas flow as required between the gas cooling conduit 201 and the bypass conduit 203. There are several solutions that can switch the gas flow between concentric tubes.

Figure 6:
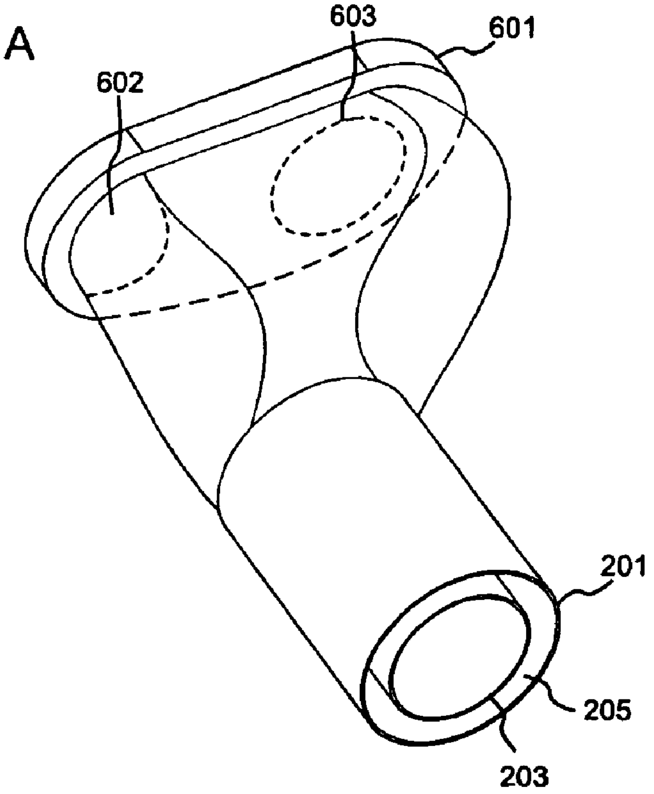
FIG. 6 illustrates schematically a switching mechanism to convert a parallel gas flow to concentric gas flow.
Figure 6:
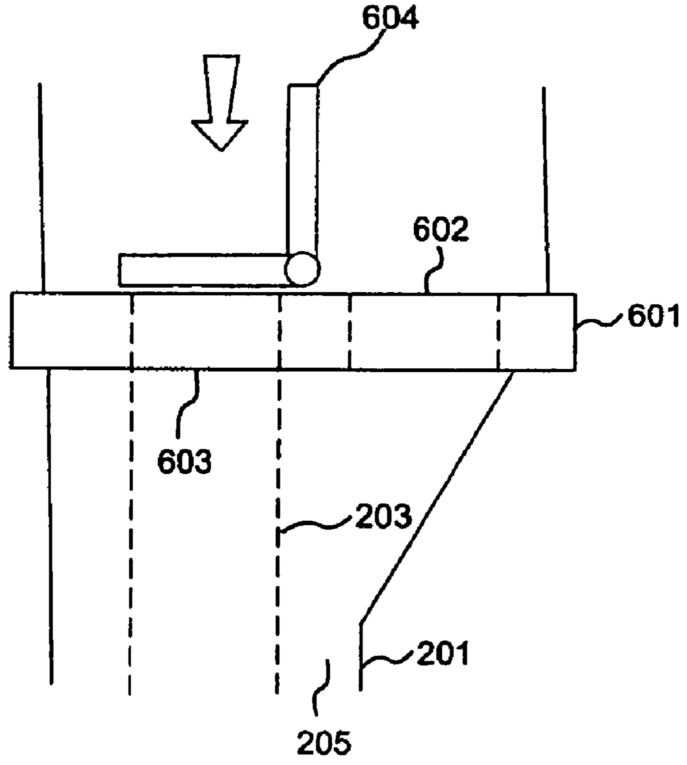

Referring to FIG. 6 herein, there is illustrated schematically a switching mechanism to convert parallel channels of gas flow to concentric channels of gas flow.

The switching mechanism comprises a valve 604 and a flange 601 having a gas cooling outlet 602 and a bypass outlet 603. The valve 604 is configured to allow a gas flow through either the gas outlet 602 or the bypass outlet 603.

Where the gas enters the valve 604, if the valve 604 is in a position to divert the exhaust gas to the gas cooling conduit 201, then the valve 604 allows the gas to flow through the gas cooling outlet 602, thereby diverting the gas through the annular space 205 between the gas cooling conduit 201 and the bypass conduit 203. The valve 604 is shown in this position in FIG. 6B.

Where the valve 604 is configured to divert the gas flow to the bypass conduit 203, the bypass outlet 603 is opened and the gas cooling outlet 602 is closed, thereby diverting the gas to flow in a space defined by the inner walls of the bypass conduit 203.

Other types of valve are possible, including valves that can switch gas flow from a cylindrical flow to concentric channel flow.

A further type of valve that may be used is a 'throttle valve'. This type of valve can control a degree of flow through one conduit or another. In some circumstances, it may be desirable to restrict the amount of heat extracted from a gas. In this instance, some of the gas is diverted through the gas cooling conduit 201 and some of the gas is diverted through the bypass conduit 203. The throttle valve controls the amount of gas diverted through each conduit.

If a small amount of cooling is required, then the throttle valve can be used to divert some of the gas flow through the gas cooling conduit 201 and the remaining gas flow through the bypass conduit 203. In this way some degree of cooling can be achieved, and the degree of cooling is controlled by the throttle valve. Similarly, if substantial but not full cooling is required, then the throttle valve can be used to divert most of the gas flow through the gas cooling conduit 201 and the remaining gas flow through the bypass conduit 203.

It is preferred, although not essential, to have the bypass valve upstream in the gas system, that is to say in the inlet of the gas heat exchanger. This would lead to a lower gas pressure drop across the gas heat exchanger 101 than an equivalent arrangement where the bypass valve was downstream of the gas heat exchanger 101, as if the bypass valve was downstream of the gas heat exchanger 101 the gas would flow into the blocked gas cooling conduit 201 under bypass conditions.

To further improve the efficiency of heat exchange when gas is flowing through the gas cooling conduit 201, it is possible to divert coolant to flow not only in the annular space 204 between the inner wall of the coolant conduit 102 and the outer wall of the gas cooling conduit 201, but also to divert coolant into the bypass conduit 203. In this way, gas flowing through the annular space 205 defined by the inner wall of the gas cooling conduit 201 and the bypass conduit 203 is in proximity to coolant both on the inside of the annulus and on the outside of the annulus. A disadvantage of this method is that when it is required to have gas flowing through the bypass conduit 203, residual coolant fluid may remain in the bypass conduit 203 which could boil and damage the gas heat exchanger.

Figure 7:
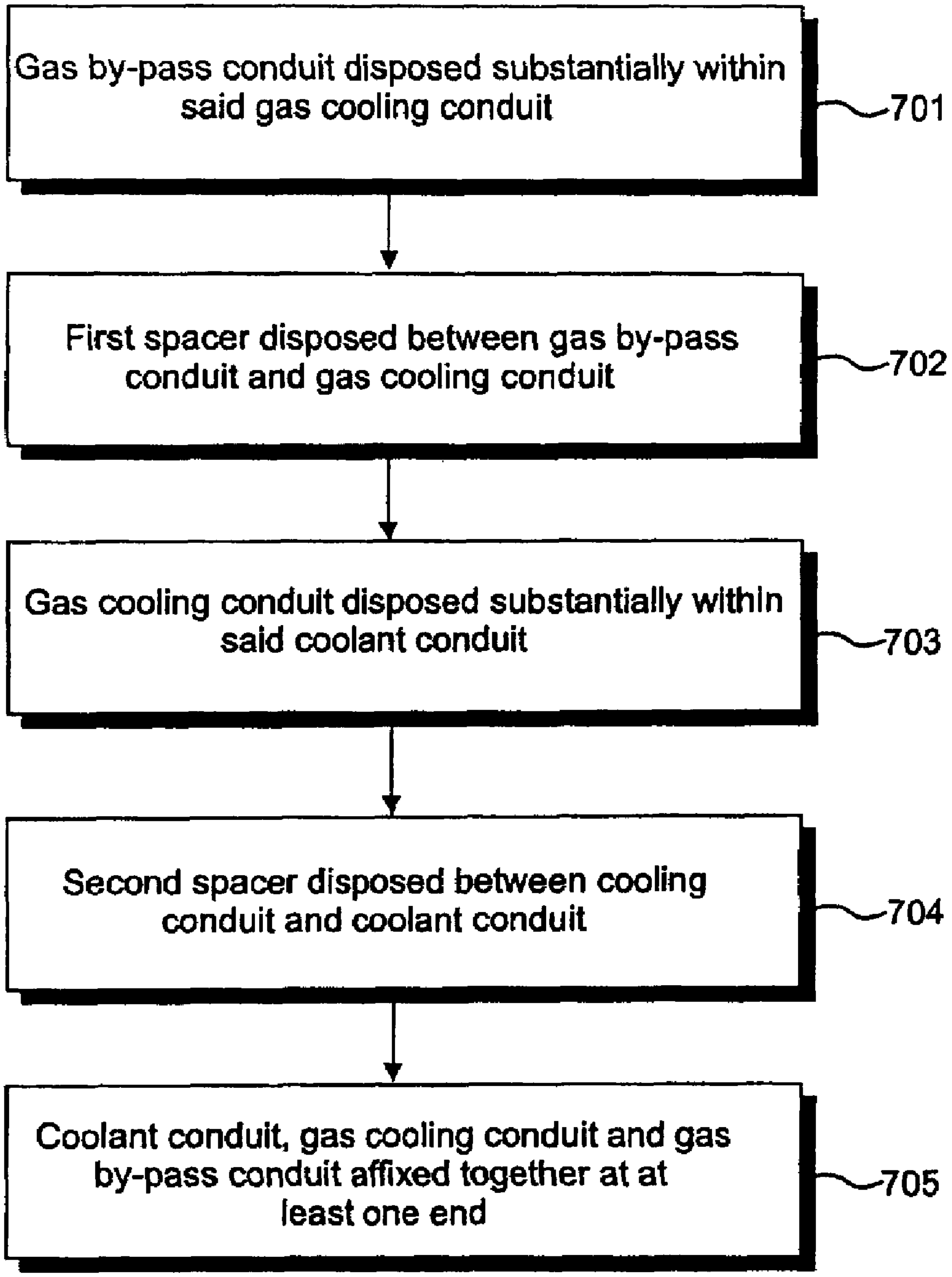
FIG. 7 illustrates schematically the steps for producing a gas heat exchanger according to the first specific embodiment.

Referring to FIG. 7 herein, there are illustrated schematically the steps for producing a gas heat exchanger according to the first specific embodiment. The gas by-pass conduit 203 is disposed 701 within the gas cooling conduit 201 such that the gas by-pass conduit 203 and the gas cooling conduit 201 are substantially concentric.

At least one first spacer 205, 206 is disposed 702 between the gas by-pass conduit 203 and the gas cooling conduit 201. The first spacer 205, 206 is provided to maintain the gas by-pass conduit 203 and the gas cooling conduit 201 in a substantially concentric position. According to this specific embodiment, the spacer 205, 206 is formed by depressing a surface of the gas cooling conduit 201 to form an indentation that touches the gas by-pass conduit 203 and keeps the main body of the gas by-pass conduit 203 apart from the gas cooling conduit 201. However, other types of spacer may be used, as described above.

The gas cooling conduit 201 is disposed 703 substantially within the coolant conduit 102 such that the gas cooling conduit 201 and the coolant conduit 102 are substantially concentric.

At least one second spacer 106, 107 is disposed 704 between the gas cooling conduit 201 and the coolant conduit. The second spacer is provided to maintain the gas cooling conduit 201 and the coolant conduit 102 in a substantially concentric position. According to this specific embodiment, the second spacer 106, 107 is formed by depressing a surface of the coolant conduit 102 to form an indentation that touches the gas cooling conduit 201 and keeps the main body of the coolant conduit 102 apart from the gas cooling conduit 201. However, other types of spacer may be used, as described above.

The coolant conduit 102, the gas cooling conduit 201 and the gas bypass conduit 203 are then affixed together 705 at at least one end to provide a gas heat exchanger comprising three substantially concentric conduits.

All these operations are carried out with each of the coolant conduit 102, the gas cooling conduit 201 and the gas bypass conduit 203 in a substantially straight configuration. This allows the conduits to be disposed in a substantially concentric position relative to each other. If a bend is required in the gas heat exchanger, for example due to space constraints, then a bend can be subsequently introduced to the gas heat exchanger. The use of spacers 106, 107, 205, 206 ensures that the conduits 102, 201, 203 remain in a substantially concentric position along the length of the gas heat exchanger even where a bend is introduced.

Figure 8:
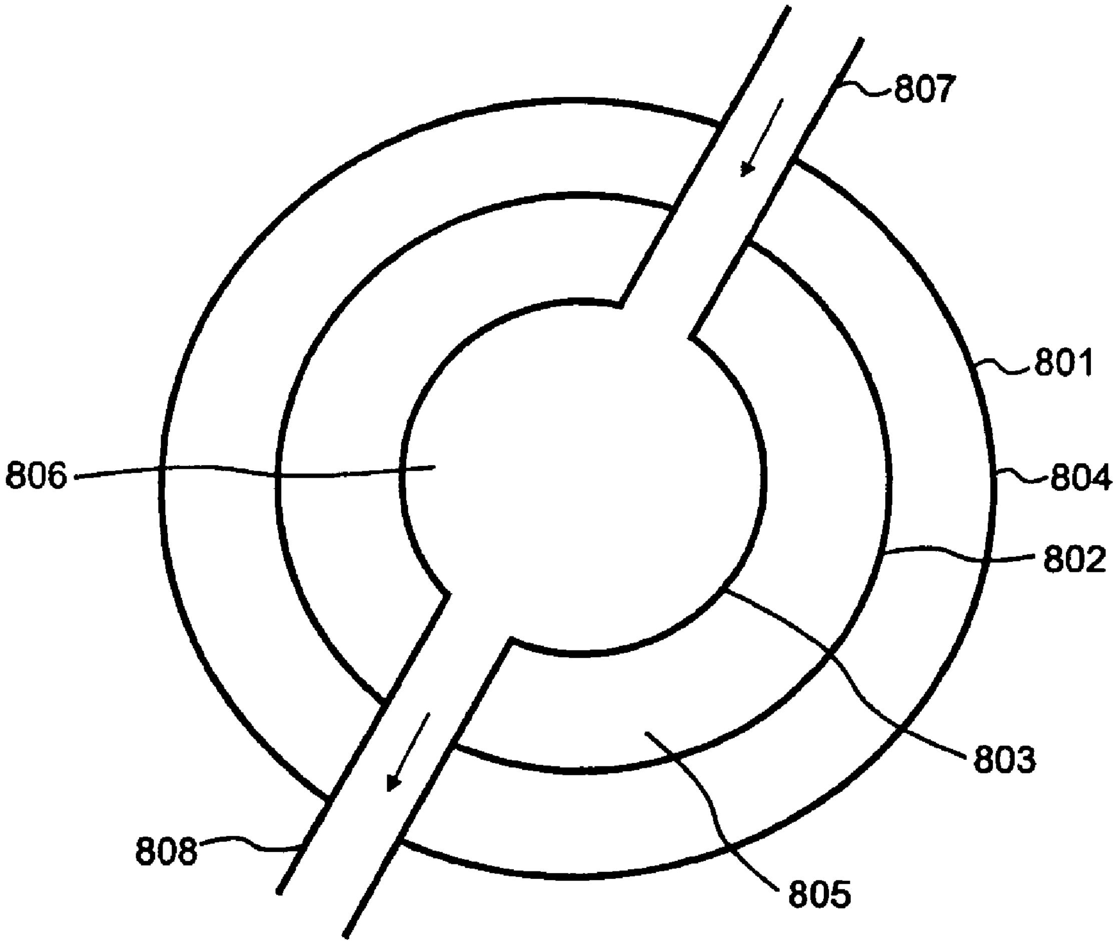
FIG. 8 illustrates schematically a cross-section of a gas heat exchanger according to second specific embodiment.

Referring to FIG. 8 herein there is illustrated schematically a cross section of a gas heat exchanger according to a second specific embodiment. A heat exchanger comprises an outer tube 801, a first inner tube 802 and a second inner tube 803.

The inner wall of the outer tube 801 and the outer wall of the first inner tube 802 defines an annular space 804 through which gas is configured to flow during bypass conditions. The inner wall of the first inner tube 802 and the outer wall of the second inner tube 803 define an annular space 805 through which gas is configured to flow during cooling conditions.

The inner wall of the second inner tube 803 defines a space 806 through which coolant fluid is configured to flow. A coolant inlet pipe 807 connects to the second inner tube 803, to allow coolant fluid to flow into the space 806 within the second inner tube 803. A coolant outlet pipe 808 is connected to the second inner tube 803 to allow coolant fluid to flow out of the space 806 within the second inner tube 803.

The annular space 805 between the first inner tube 802 and the second inner tube 803 serves the same function as in the first specific embodiment. That is to say, when gas cooling is required it allows a flow of gas through the annular space 805 that is in close proximity to coolant fluid contained within the second inner tube 803, thereby increasing the efficiency of gas cooling. Under bypass conditions, the stagnant gas in the annular space 805 acts as a thermal barrier between the coolant fluid contained in the second inner tube 803 and the gas flowing through the annular space 804 between the outer tube 801 and the coolant fluid contained in the second inner tube 803.

In all other respects, the second specific embodiment is compatible with the first specific embodiment.

Figure 9:
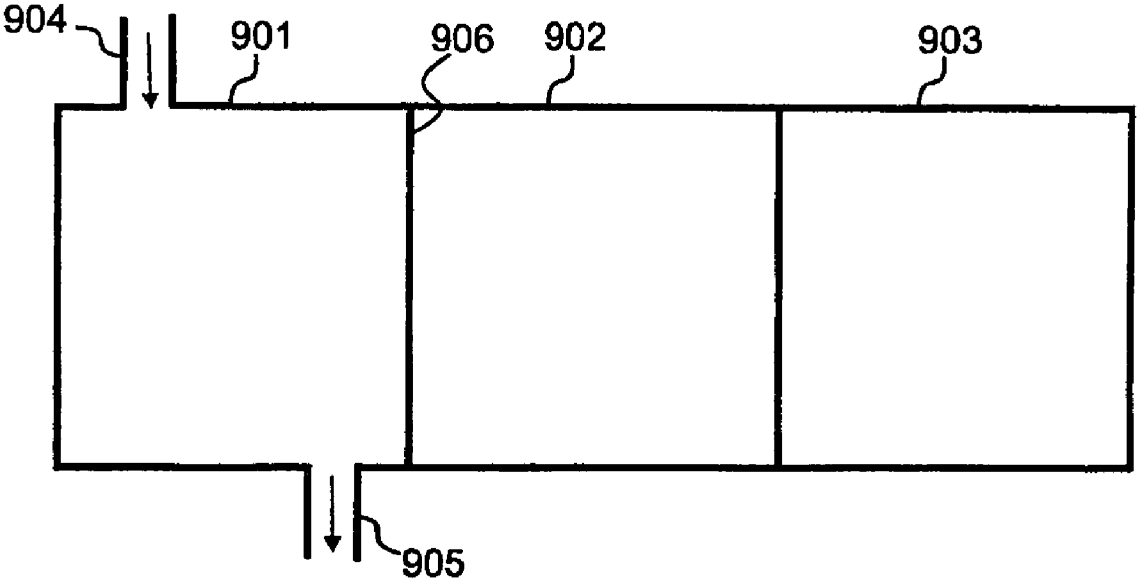
FIG. 9 illustrates schematically a cross-section of a gas heat exchanger according to a third specific embodiment.

Referring to FIG. 9 herein, there is illustrated schematically a cross section of a gas heat exchanger according to a third specific embodiment. The gas heat exchanger comprises a coolant conduit 901, a gas cooling conduit 902 and a bypass conduit 903. The gas cooling conduit 902 is disposed between the coolant conduit 901 and the bypass conduit 903.

The cooling conduit 901 further comprises a coolant inlet 904 and a coolant outlet 905, configured to allow coolant fluid to flow through the coolant conduit 901.

When cooling is required, gas is diverted through the gas cooling conduit 902. Cooling of the gas occurs at the interface 906 between the coolant conduit 901 and the gas cooling conduit 902. When cooling is not required, gas is diverted to flow through the bypass conduit 903. Stagnant gas in the gas cooling conduit 902 during bypass conditions acts as a thermal barrier between gas flowing through the bypass conduit 903 and coolant fluid flowing through the coolant conduit 901. In this way, heat losses are reduced from the gas flowing through the bypass conduit 903.

The third specific embodiment is not the preferred specific embodiment, because the surface area to volume ratio of gas flowing through the gas cooling conduit 902 is reduced compared to the first and second specific embodiment, thereby reducing the efficiency of heat exchange. Furthermore, it is more difficult to include corrugations or other means to compensate for differences in the thermal expansion of the conduits 901, 902, 903, or to introduce a bend portion into the gas heat exchanger.

The above description of the first specific embodiment describes one way of disposing the gas coolant conduit 201 between the bypass conduit 203 and the coolant conduit 102. That is to say, having 3 substantially concentric tubes with the outer tube being configured to carry coolant fluid, the first inner tube being configured to carry gas to be cooled, and the second inner tube configured to be a bypass conduit is one way of reducing the contact between coolant in the coolant conduit 102 and gas in the bypass conduit 203.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

The invention claimed is:

1. A method of manufacturing a gas heat exchanger comprising the steps of:

providing a coolant conduit;

providing a gas cooling conduit;

providing a gas by-pass conduit;

disposing at least a portion of said gas cooling conduit between at least a portion of said coolant conduit and at least a portion of said gas bypass conduit such that said gas cooling conduit is configured to provide a thermal barrier between said coolant conduit and said gas by-pass conduit; and further comprising the steps of disposing said gas by-pass conduit substantially within said gas cooling conduit, such that said gas by-pass conduit and said gas cooling conduit are substantially concentric;

disposing at least one first spacer between said gas by-pass conduit and said gas cooling conduit such that said first spacer maintains said gas by-pass conduit and said gas cooling conduit in a substantially concentric position;

disposing said gas cooling conduit substantially within said coolant conduit, such that said gas cooling conduit and said coolant conduit are substantially concentric;

disposing at least one second spacer between said gas cooling conduit and said coolant conduit such that said second spacer maintains said gas cooling conduit and said coolant conduit in a substantially concentric position; and affixing said coolant conduit, said gas cooling conduit and said gas bypass conduit together at at least one end.

2. A method of manufacturing a gas heat exchanger comprising the steps of:

providing a coolant conduit;

providing a gas cooling conduit;

providing a gas by-pass conduit;

disposing at least a portion of said gas cooling conduit between at least a portion of said coolant conduit and at least a portion of said gas bypass conduit such that said gas cooling conduit is configured to provide a thermal barrier between said coolant conduit and said gas by-pass conduit; and further comprising the steps of forming a first spacer between said gas by-pass conduit and said gas cooling conduit by pressing a depression in a surface of said gas cooling conduit; and forming a second spacer between said gas cooling conduit and said coolant conduit by pressing a depression in a surface of said coolant conduit.

3. A method of manufacturing a gas heat exchanger comprising:

providing a coolant conduit;

providing a gas cooling conduit;

providing a gas by-pass conduit;

disposing at least a portion of said gas cooling conduit between at least a portion of said coolant conduit and at least a portion of said gas bypass conduit such that said gas cooling conduit is configured to provide a thermal barrier between said coolant conduit and said gas by-pass conduit.

4. A method of manufacturing a gas heat exchanger as claimed in claim 3 further comprising:

bending said gas heat exchanger into a required configuration.

5. A gas heat exchanger comprising:

a coolant conduit;

a gas cooling conduit; and a gas by-pass conduit;

wherein at least a portion of said gas cooling conduit is disposed between at least a portion of said coolant conduit and at least a portion of said gas by-pass conduit, wherein said gas cooling conduit is configured to provide a thermal barrier between said coolant conduit and said gas by-pass conduit;

wherein said coolant conduit comprises an outer tube; and said gas cooling conduit comprises a first inner tube, said first inner tube being disposed substantially within said outer tube; and said gas by-pass conduit comprises a second inner tube, said second inner tube being substantially disposed within said first inner tube.

6. A gas heat exchanger as claimed in claim 5 wherein an insert is disposed between said outer tube and said first inner tube, and an insert is disposed between said first inner tube and said second inner tube, said inserts being configured to maintain said tubes in a substantially concentric position;

said inserts being selected from any of the following: clip; ring; bracket; form of compressed wire mesh.

7. A gas heat exchanger as claimed in claim 5 wherein said outer tube comprises at least one indent configured to separate said first inner tube from said outer tube; and said first inner tube comprises at least one indent configured to separate said first inner tube from said second inner tube;

wherein said indents are configured to maintain said tubes in a substantially concentric position.

8. A gas heat exchanger as claimed in claim 5 wherein said first inner tube comprises at least one protrusion configured to separate said first inner tube from said outer tube; and said second inner tube comprises at least one protrusion configured to separate said second inner tube from said first inner tube;

wherein said protrusions are configured to maintain said tubes in a substantially concentric position.

9. A gas heat exchanger as claimed claim 5 wherein each said tube has a wall thickness of between 0.2 and 1.5 mm.

10. A gas heat exchanger as claimed in claim 5 wherein each said tube comprises any of the following materials: austenitic stainless steel; ferritic stainless steel; copper; copper alloy; nickel; nickel alloy; carbon fibre braid.

11. A gas heat exchanger comprising:

a coolant conduit;

a gas cooling conduit;

a gas by-pass conduit;

wherein at least a portion of said gas cooling conduit is disposed between at least a portion of said coolant conduit and at least a portion of said gas by-pass conduit, wherein said gas cooling conduit is configured to provide a thermal barrier between said coolant conduit and said gas by-pass conduit.

12. A gas heat exchanger as claimed in claim 11 wherein during a first mode of operation said gas cooling conduit is configured to carry a gas; and during a second mode of operation said gas cooling conduit is configured to reduce a heat exchange between said coolant conduit and said bypass conduit, and said bypass conduit is configured to carry a gas.

13. A gas heat exchanger as claimed in claim 11 wherein said gas cooling conduit is disposed substantially along a length of said gas heat exchanger between said coolant conduit and said bypass conduit.

14. A gas heat exchanger as claimed in claim 11 wherein at least a portion of a wall of said gas cooling conduit defines an interface between said gas cooling conduit and said coolant conduit; and at least a portion of a wall of said gas by-pass conduit defines an interface between said gas by-pass conduit and said gas cooling conduit.

15. A gas heat exchanger as claimed in claim 11 wherein said gas cooling conduit is disposed substantially within said coolant conduit; and said gas by-pass conduit is disposed substantially within said gas cooling conduit.

16. A gas heat exchanger as claimed in claim 11 wherein said coolant conduit is corrugated along at least a portion of its length.

17. A gas heat exchanger as claimed in claim 11 wherein said gas cooling conduit is corrugated along at least a portion of its length.

18. A gas heat exchanger as claimed in any claim 11 wherein said gas by-pass conduit is corrugated along at least a portion of its length.

19. A gas heat exchanger as claimed in claim 11 wherein said gas by-pass conduit is formed of strip-wound hose.

20. A gas heat exchanger as claimed in claim 11 further comprising at least one bend along its length.

21. A gas heat exchanger as claimed in claim 11 comprising a valve, said valve configured to switch a gas flow through said gas cooling conduit during a first mode of operation, and through said gas by-pass conduit during a second mode of operation.

22. A gas heat exchanger as claimed in claim 11 further comprising means to connect said gas heat exchanger at at least one end with an exhaust gas system of an internal combustion engine.

23. An internal combustion engine comprising the gas heat exchanger as claimed in claim 11.

24. A gas heat exchanger as claimed in claim 11 wherein during a third mode of operation said gas cooling conduit and said bypass conduit are both configured to carry gas.

25. A gas heat exchanger as claimed in claim 24 comprising a throttle valve, said throttle valve being configured to control a degree of gas flow through said gas cooling conduit and to control a degree of gas flow through said bypass conduit.

* * * * *